Figure 1:
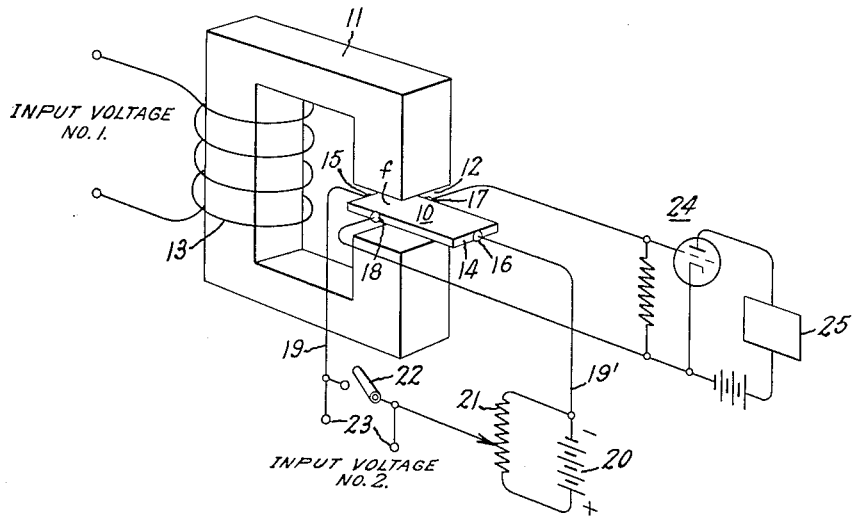

Inventor:
William C. Dunlap Jr,
by Paul A. Frank
His Attorney.

Feb. 28, 1956 W. C. DUNLAP, JR 2,736,822
HALL EFFECT APPARATUS
Filed May 9, 1952 2 Sheets-Sheet 2

Inventor:
William C. Dunlap Jr.,
by Paul L. Frank
His Attorney.

United States Patent Office 2,736,822
Patented Feb. 28, 1956

2,736,822

HALL EFFECT APPARATUS

William C. Dunlap, Jr., Schenectady, N. Y., assignor to General Electric Company, a corporation of New York Application May 9, 1952, Serial No. 287,076

23 Claims. (Cl. 307—88.5)

My invention relates to electric control and measuring apparatus which utilize the property of certain materials to produce an electric potential at laterally spaced points along one axis of the material when a current is passed through an orthogonal axis thereof under the influence of a transverse magnetic field. This electrical property of these materials has become known as the "Hall effect," and devices which utilize materials having this property are customarily called "Hall effect devices." Such Hall effect devices have found utility in electric measurement circuits and apparatus, and in electric computing and telemetering systems.

The output voltage produced by conventional Hall effect devices is generally proportional to the product of the magnetic field strength and the intensity of the current passed through a Hall effect element called the "Hall plate." The term "Hall plate" is used in this specification and appended claims to define a thin metal plate of substantial "Hall effect coefficient" having a pair of spaced input electrodes connected to supply current through the plate between these input electrodes and having a pair of output electrodes connected to the plate on opposite sides of the input current path. The absolute magnitude of this Hall effect output voltage for a given magnetic field and a given input Hall plate current is dependent upon the composition and dimensions of the Hall plate. The output voltage in such conventional devices varies substantially linearly with variations in either the magnetic field or the input Hall plate current.

In many applications of Hall effect devices, however, it is desirable that the Hall effect device have a non-linear characteristic such that the device is sensitive to input Hall plate current variations at a low current level, but relatively insensitive to high current level variations. Moreover, it is often desired that the absolute magnitude of the output Hall effect voltage from a Hall effect device utilizing a constant magnetic field be adjustable for a given Hall plate current, or that the output Hall effect voltage of such constant field excited devices be responsive not only to variations of the input Hall plate current but also to variations of an auxiliary signal voltage. In addition, conventional Hall effect apparatus is not capable of producing an output voltage responsive to more than two input signals; namely, signals controlling the magnetic field strength and the input Hall plate current. In many applications, it is also desired that the output Hall effect voltage be responsive to a third electric signal.

Accordingly, one object of my invention is to provide a Hall effect device having a non-linear input Hall plate current versus output Hall effect voltage characteristic.

Another object is to provide Hall effect apparatus sensitive to input Hall plate current variations at a low current level but relatively insensitive to such variations at a high current level.

Another object of the invention is to provide a Hall effect apparatus in which the level of output Hall effect voltage may be adjusted to any desired magnitude for a given input Hall plate current and a given magnetic field strength.

A further object of the invention is to provide a Hall effect apparatus capable of producing an output voltage which varies in response to the variations of three input electric signals.

A still further object of the invention is to provide a Hall effect device which may be constructed to rectify the input Hall plate current and thereby to provide a rectified output Hall effect voltage.

In accordance with one feature of the invention a germanium Hall plate is utilized, and the Hall electrodes making connection to the Hall plate are constructed and arranged to make use of a phenomenon which may be called "conduction carrier" or "mobile charge" emission to modify the generated output Hall effect voltage. In this "conduction carrier" emission phenomenon, a stream of mobile negative or positive conduction carriers or "charges" is produced which is believed to correspond respectively to a stream of electrons or electron vacancies in the germanium metal. If N-type germanium is used for the Hall plate, a stream of positive mobile charges is produced therein; while if P-type germanium is used for the Hall plate, a negative mobile charge stream is produced therein. By suitable arrangement and construction of the Hall electrodes and suitable choice of a proper polarity conductivity-type germanium and electric potentials supplied thereto, this stream of conduction carriers or mobile charges is made to traverse the Hall plate simultaneously with the input electric current therethrough, and tends to produce, under the influence of a transverse magnetic field, a Hall effect voltage opposite to that normally produced by the input electric current. Consequently, the effective output Hall effect voltage induced between the output Hall electrodes is reduced. The input electric current traversing the Hall plate may be made to flow to the same electrode which produces the stream of mobile charges or may also be made to flow to an auxiliary electrode connection. At low levels of conduction carrier emission there is little effect on the conventional Hall effect output voltage, but at high levels of conduction carrier emission, the output Hall effect voltage is substantially reduced over that which would be present without such emission.

If the Hall plate comprises N-type germanium, a positive charge emitting electrode connection to the germanium plate may be made by bringing a conductor into point contact with the plate surface but is preferably made by depositing, fusing, or diffusing an acceptor type impurity element upon or within the N-type germanium plate surface and connecting an electric conductor to this acceptor impurity. Similarly, if the Hall plate comprises P-type germanium, a negative charge emitting connection may likewise be made by bringing a conductor into point contact with the Hall plate surface but is preferably made by depositing, fusing, or diffusing a donor type impurity element upon or within the P-type germanium plate surface and connecting an electric conductor to this donor impurity. In order that the conduction carrier emission may have an appreciable effect upon the output Hall effect voltage, the output Hall electrodes are positioned very close to the mobile charge emitting electrode. The mobile charge emitting electrode may be made in such a manner as also to constitute a rectifying connection with the germanium plate such that a rectification of an input Hall plate alternating current may be produced, if desired.

Figure 7:
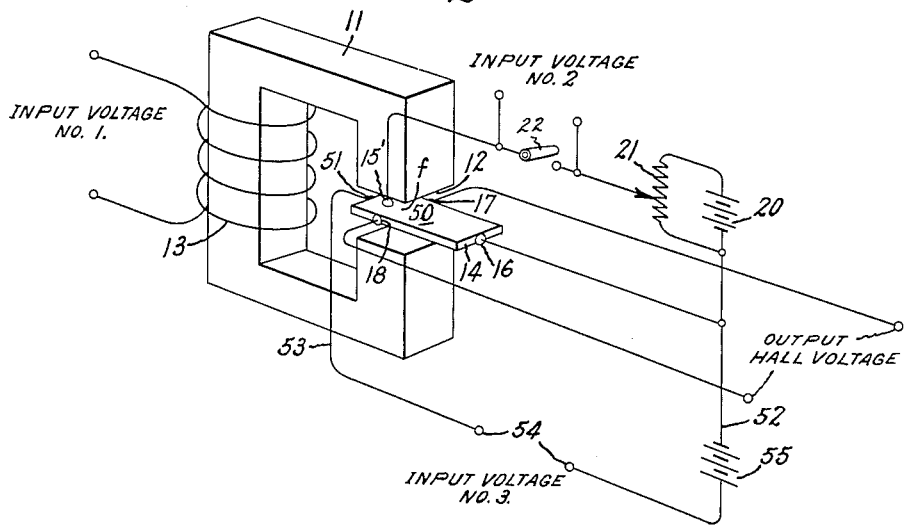
Figure 8:
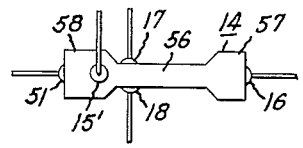

The novel features which are believed characteristic of the invention are set forth in the appended claims. The invention itself, however, together with further objects and advantages thereof, may best be understood by reference to the following description taken in connection with the accompanying drawing in which Fig. 1 is a schematic diagram of Hall effect apparatus embodying the invention; Figures 2 and 3, 4 and 5 are detailed views of Hall plate constructions which may be used in the apparatus of Fig. 1; Fig. 6 is a typical characteristic curve of the output Hall effect voltage vs. Hall plate current produced by the Hall effect apparatus of Fig. 1; Fig. 7 is a schematic diagram of Hall effect apparatus embodying a modification of the invention; and Fig. 8 is a detailed view of a Hall plate construction preferably included in the device of Fig. 7.

Referring to Fig. 1, the invention is shown in one form as comprising a Hall plate 10 located within a transverse strong magnetic field $f$ ranging, for example, between 3,000 and 15,000 Gauss, produced by any suitable means such as an electromagnet 11 having an air gap 12 within which Hall plate 10 is located. The magnetic field $f$ may either have unidirectional constant intensity such as produced by a permanent magnet or by a constant current supplied through an energizing coil 13 of electromagnet 11; or may have an alternating direction and varying intensity such as produced by an alternating current supplied through coil 13. Hall plate 10 comprises a body member 14, consisting of highly purified germanium metal, either N-type or P-type, preferably in the form of a thin elongated plate or filament as illustrated, and includes input Hall electrodes 15, 16 and output Hall electrodes 17, 18 connected to body member 14 in aligned relation and on opposite sides of the current path between input electrodes 15, 16. Typical dimensions for Hall plate 10 are .30" in length, .050" in width, and .010" in thickness. The construction is similar to conventional Hall plates with the exception that input Hall electrode 15 constitutes a mobile charge emitting electrode capable of introducing conduction carriers of opposite polarity to the predominant conduction carriers in the germanium body member 14, as fully explained hereinafter. Output electrodes 17 and 18 are located very close to input eelctrode 15, preferably less than .040" away therefrom in order to be subjected to the influence of a traversing mobile charge stream to be emitted from electrode 15 toward electrode 16. Input Hall electrodes 15 and 16 are connected through conductors 19 and 19' to a variable voltage source comprising battery 20 and potentiometer 21. With an N-type germanium body member 14, battery 20 is connected with the polarity indicated in Fig. 1 such that mobile charge emitting electrode 15 is maintained at a positive potential with respect to electrode 16. With a P-type germanium body member 14, battery 20 is connected in reversed polarity to that shown in Fig. 1 such that mobile charge emitting electrode 15 is supplied with a negative potential relative to electrode 16. A switch 22 is preferably connected in series with conductor 19 and a pair of input signal electrodes 23 are connected in parallel with switch 22 in order that the voltage at an adjustable tap of potentiometer 21 may alternatively be supplied directly to input Hall electrodes 15 and 16 or may be supplied thereto through a superimposed signal voltage. The output voltage generated between output Hall electrodes 17 and 18 is supplied to the input circuit of an amplifier 24, and the amplified output voltage or current from amplifier 24 is utilized to energize any desired electrical load 25, such as an electric indicator or control device.

As mentioned above, body member 14 of Hall plate 10 constitutes either N-type or P-type highly purified germanium metal. By "highly purified" I mean a body member 14 consisting of over 99.9% germanium. Negative or "N"-type germanium is germanium having an excess of electronic conduction carriers therein such as normally produced by minute quantities within the germanium of significant "donor" or electron-donating impurity elements of the nitrogen group, such as antimony, phosphorus, or arsenic. Positive or "P"-type germanium is germanium having an excess of electron-vacancy conduction carriers therein, such as normally produced by minute quantities of significant "acceptor" or electron absorbing impurity elements, such as indium, aluminum, or gallium. The resistivity of body member 14 depends to a large extent upon the purity of the germanium, since any electricity conducting impurities tend to reduce the resistivity thereof. In most Hall effect applications, it is preferable to employ a Hall plate having fairly high impedance and thus to employ germanium having fairly high resistivity, for example, of the order of 10 ohmcentimeters.

Input Hall electrode 16 and both output Hall electrodes 17 and 18 constitute any electrically conductive metals soldered or otherwise secured in good electric conducting relation with germanium body member 14. When body member 14 constitutes N-type germanium, electrodes 16, 17 and 18 each preferably constitutes an electron donating impurity metal, such as antimony, which makes excellent electrically conducting contact with N-type germanium.

With an N-type germanium body member 14, electrode 15 constitutes a positive charge emitting electrode and comprises either a point-contacting electrode, or a largearea contacting electrode containing an electron absorbing "acceptor" impurity element for germanium, such as indium, gallium, or aluminum. Both such point contacting and larger-area contacting electrodes 15 normally also constitute rectifying connections with the N-type germanium body member although good positive charge emission has been achieved with similar connections of a non-rectifying character.

If P-type germanium is used for body member 14, electrode 15 constitutes a negative charge emitting electrode comprising either a point-contacting electrode or a largerarea contacting electrode containing an electron donating "donor" element for germanium such as antimony, phosphorus or arsenic. Both such point contacting and larger area donor impurity containing electrodes normally constitute rectifying connections with a P-type germanium body member although good negative charge emission can also be achieved with negative charge emitting electrode connections of a non-rectifying character.

Figure 2:
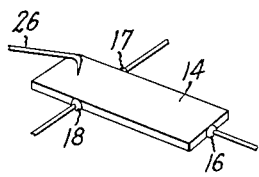

In Fig. 2, there is shown a Hall plate 10 construction utilizing a point contacting conductive whisker 26 as the mobile charge emitting electrode 15. Gold, platinum, or platinum alloy are suitable for the contacting whisker 26 and may, for greater strength, be welded to the germanium body member 14 at the contacting tip. The contacting surface of body member 14 is preferably polished and etched in accord with well-known diode construction techniques before the whisker 26 is contacted or welded thereto. In this point contacting construction, a surface condition having conductivity characteristics of opposite polarity to that of the body member is believed to be responsible for the resulting conduction carrier emission phenomenon.

Figure 3:
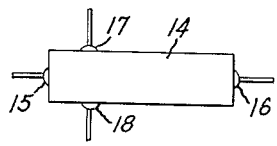
Figure 4:
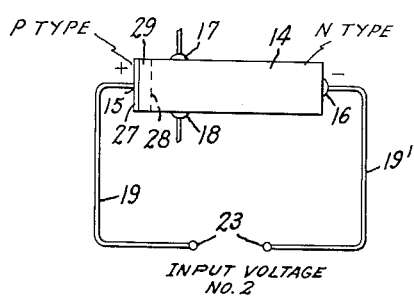
Figure 5:
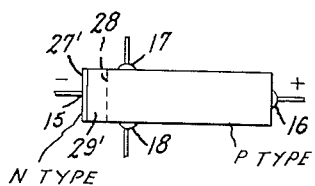
Figure 6:
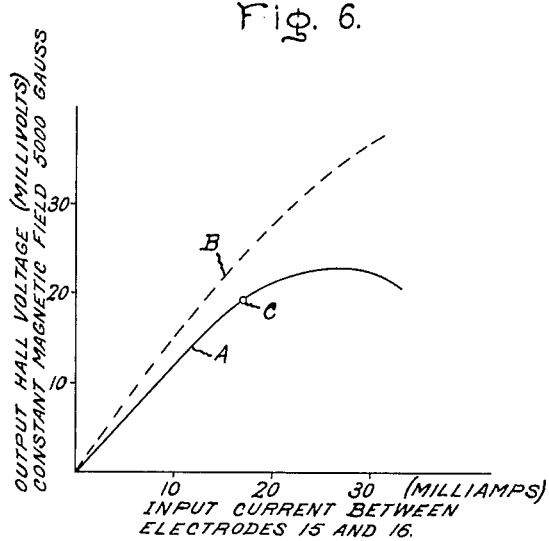

In Figs. 3, 4 and 5 there are shown alternative constructions of Hall plate 10 in which the mobile charge emitting electrode 15 includes a significant donor or acceptor impurity element 27 which furnishes the stream of positive or negative charges, as the case may be, in the opposite polarity conductivity-type germanium under the influence of a properly directed electric field. In Fig. 3, the impurity element 27, preferably indium for an N-type germanium body member and antimony for a P-type body member, is shown in the form of a small dot or drop secured in contact with the germanium body member 14 by any suitable means such as evaporation, soldering, fusion or diffusion under suitable heat treatment. The consequent intimate contact between the acceptor impurity element and a N-type germanium body member, or between the donor impurity element and a P-type germanium body member usually results in a P-N junction rectifying barrier similar to that described below in connection with Figs. 4 and 5, but good mobile charge emission has been achieved even with a very poor or practically nonexistent rectifying barrier.

In Figs. 4 and 5 Hall plate 10 is shown as including a definite rectifying P-N junction barrier 28. In Fig. 4, a positive or P-type germanium zone 29 of a P-N junction unit includes the acceptor impurity metal and constitutes the mobile charge emitting electrode 15; while in Fig. 5, a negative or N-type germanium zone 29' of a P-N junction unit includes the donor impurity element and constitutes the mobile charge emitting electrode 15. Due to the rectifying characteristics of P-N junction 28, an alternating voltage supplied between electrodes 15 and 16 produces only unidirectional pulses of Hall plate current therebetween and induces unidirectional output Hall effect voltage pulses between output Hall electrodes 17 and 18. Since the P-N junction barrier permits Hall plate current flow only during source voltage alternations when P-type germanium zone 29 is at a positive potential with respect to electrode 16 or when N-type germanium zone 29' is negative with respect to electrode 16, there is no absolute necessity for auxiliary voltage biasing means, such as battery 20 and potentiometer 21; and input electrodes 15 and 16 may, for some applications, be directly connected to receive an input alternating voltage, as indicated in Fig. 4.

The mobile charge emitting electrode 15 of Figs. 3, 4 and 5 may be made in accord with any of the known methods of producing a P-N junction barrier in a germanium wafer. One suitable and convenient method is disclosed in my patent application, Serial No. 187,490 entitled "P-N Junction Units and Method of Making the Same" filed September 29, 1950, and assigned to the present assignee. In accord with this method, a donor or acceptor impurity element 27, such as antimony or indium, is brought into contact with the surface of an opposite polarity conductivity type germanium member and a partial depth diffusion of this impurity element into the germanium is effected by a temporary, for example, several minutes, application of heat in the neighborhood of 600 degrees centigrade. The surface-adjacent zone or region into which this impurity element is diffused becomes converted thereby into a P-type germanium zone 29 if an acceptor impurity is used and into an N-type zone 29' if a donor impurity is used. A P-N junction rectifying barrier 28 is thus produced at the boundary between the P and N-type germanium zones. A good electric conductive connection 19 is then made to the impurity impregnated germanium zone 29, 29' or to any remaining impurity element 27, 27' fused to the germanium surface. The region of the germanium surface encompassing and including the P-N junction connection is then preferably etched in accord with well known techniques to prevent short circuiting of the P-N junction barrier where it meets the surface of the germanium member.

The operation of the control device of Fig. 1 may be easily understood by reference to the curves of Fig. 6. Presume that a constant current is supplied through coil 13 of electromagnet 11 such that the magnetic field intensity produced in gap 12 is substantially constant. Presume also that switch 22 is closed, and the adjustable tap of potentiometer 21 is varied from its minimum voltage position to its maximum voltage position. Curve A of Fig. 4 represents a typical output voltage that is produced between output electrodes 17 and 18 of the Hall effect apparatus of Fig. 1 with the consequent increase in Hall plate current between electrodes 15 and 16; while dotted curve B of Fig. 4 represents a typical output voltage that would be produced if input electrode 15 were not a mobile charge emitting electrode connection or if a conventional Hall plate were substituted for the Hall plate 10 of the present invention. It will be readily seen by comparison of curves A and B that the output Hall voltage is drastically reduced as the input current is increased, even to the point of causing a decrease in output voltage with a further increase in input Hall plate current. In utilizing the device of Fig. 1 as a non-linear output control device, the adjustable tap of potentiometer 21 is adjusted to any operating point such as point C on curve A of Fig. 4, switch 22 is opened, and a signal voltage is supplied to terminals 23 to vary the input Hall plate current between electrodes 15 and 16 about this operating point in accordance with this signal voltage. The output Hall effect voltage then varies in accord with the non-linear input current vs. output voltage characteristic of the device.

The following explanation is offered for this unusual reduction in output Hall voltage at high level input currents, it being understood that the invention is not to be in any way restricted by this possible explanation or interpretation of the phenomena involved. As the mobile charge emitting electrode 15 is made positive with respect to the input electrode 16 with an N-type germanium body member 14, a conventional electronic current passes between electrodes 15 and 16 and, in addition, a stream of positive mobile charges, believed to be electron vacancies, moves from mobile charge emitting electrode 15 toward input electrode 16. The Hall voltage induced in output electrodes 17 and 18 by the displacement of the electronic conduction stream under the influence of the transverse magnetic field is opposite in sign to the Hall voltage induced in electrodes 17 and 18 as a result of this positive charge stream. The lifetime of the positive charge carriers or "electron vacancies" is quite short since they soon capture or recombine with excess electrons to remove both the vacancy and the electron from the conduction process. The positive charge stream thus has sufficient lifetime and velocity to produce an appreciable Hall effect voltage only in the immediate vicinity of the positive charge emitting electrode 15, for example, within .040" thereof, and this velocity is proportional to the intensity of the potential difference between electrodes 15 and 16. By locating the output Hall electrodes 17 and 18 in the immediate vicinity of the positive charge emitting electrode 15, the output Hall voltage induced by this positive charge stream tends to counteract the Hall voltage output produced by the magnetic-field-influenced electronic stream such that, at high potential differences between electrodes 15 and 16, the output Hall effect voltage is substantially reduced, even to the extent of decreasing the absolute magnitude of this output Hall effect voltage with an increase in electronic current. If body member 14 constitutes P-type germanium and electrode 15 constitutes a negative charge emitting connection, electrode 15 is then maintained at a negative potential relative to electrode 16, and the input electronic conduction therebetween flows in a direction opposite to that with an N-type body member. However, since the polarity of the output Hall voltage with P-type germanium is normally opposite to that with N-type germanium, for the same duration of input current, this reversal in direction of input current causes the output Hall effect voltage to have the same polarity regardless of whether an N-type or P-type body member 14 is employed. The Hall effect output voltage from P-type germanium results from the lateral displacement of the predominant positive conduction carriers inherent in such P-type germanium, and the mobile negative charge stream from a negative charge emitting electrode 15 counteracts and reduces such Hall effect output voltage in the same manner as discussed above in connection with an N-type germanium body member 14.

Referring now to Fig. 7, there is shown an alternative embodiment of the invention in which the input Hall plate current from a mobile charge emitting electrode 15 may be employed to control an auxiliary electronic conduction path through the germanium Hall plate. In Fig. 7, a Hall plate 50 is employed similar to Hall plate 10 with the exception that a conventional good electron conductive electrode connection 51 is made to germanium member 14 in the position occupied by mobile-charge emitting electrode 15 of the Hall plate 10 of Fig. 1, and a mobile charge emitting electrode 15' is connected to a face of body member 14 adjacent output electrodes 17 and 18 on the same side thereof as electrode 51. Electrodes 16, 17, 18 and 51 thus comprise good electric conductive connections to mutually perpendicular opposite edges of Hall plate 14 in the same manner as any conventional Hall plate. Mobile charge-emitting electrode 15' is preferably located within .040" from oppositely aligned output electrodes 17 and 18 and may be a donor or acceptor impurity electrode non-rectifying connection or may be an N-type or P-type germanium zone of a P-N junction rectifying connection as discussed in connection with electrode 15 of Figs. 2 and 3, 4 and 5. The control circuit for the device of Fig. 7 is identical with that of Fig. 1, as indicated by the use of similar numerals for the designation of similar components, with the exception that additional conductors 52 and 53 are provided which make connection from auxiliary terminals 54 through a voltage source such as battery 55, to electrodes 16 and 51 respectively. With an N-type germanium body member 14, battery 55 is connected so as to maintain electrode 51 at a positive potential with respect to electrode 16; while potentiometer 21 is preferably adjusted so that electrode 15' is also biased at a positive potential relative to electrode 16 but at a negative potential relative to electrode 51. With a P-type body member 14 and a negative charge emitting electrode 15', the polarities of batteries 20 and 55 are revsersed so as to bias electrode 15' to a negative potential relative to electrode 16 but to a positive potential relative to electrode 51.

In this Fig. 7 embodiment of the invention, an output Hall effect voltage between electrodes 17 and 18 is attainable which varies in response to the simultaneous variation of three input signal voltages. A first voltage supplied to coil 13 functions to vary the intensity of the magnetic field through Hall plate 50; a second voltage supplied to terminals 54 varies the intensity of the electronic current stream between electrodes 16 and 51; while a third voltage supplied to terminals 23, with switch 22 open, functions to modulate the output Hall voltage inducing effect of the electronic streams between electrodes 16 and 51 and between electrodes 16 and 15' in accord with the mobile charge emission from electrode 15'. With N-type germanium, electrode 51 is maintained positive with respect to electrode 15' in order to repel the positive mobile charge stream from electrode 15' toward negative electrode 16 and thus to traverse output Hall electrodes 17 and 18. With a P-type germanium Hall plate, electrode 51 is maintained at a negative potential relative to electrode 15' in order to repel the negative charge stream from electrode 15' toward positive electrode 16, and thus also to traverse output electrode 17 and 18. Any or all of these three input signals may be maintained at a constant level in order to produce an output Hall effect voltage which varies in response to any one, any two, or all three input signals.

It will be appreciated that Hall plate 50 should preferably have a width between output electrodes 17 and 18 no greater than approximately 0.10" in order that mobile charge emitting electrode 15 may extend within .040" of both output electrodes 17 and 18. Mobile charge emitting electrode 15' preferably extends over only a small area in order that maximum directivity of the mobile charge stream toward electrode 16 may be achieved. One highly advantageous configuration for Hall plate 50, for use in the embodiment of Fig. 5, is shown in Fig. 8. In this Fig. 8 configuration, the germanium member 14 has a central filamentary portion 56 in the neighborhood of .020" in width between output Hall electrode 17 and 18 and has wider end portions 57 and 58 making good conductive contact with electrodes 16 and 51 respectively.

Mobile charge emitting electrode 15' is located in the center of the widening portion 58 so as to be very close to output electrodes 17 and 18 and yet definitely upon the opposite side thereof from electrode 16.

It will thus be seen that I have provided a versatile Hall effect control device capable of producing a non-linear rectified or non-rectified output Hall voltage and also capable of controlling the absolute or relative magnitude of the output Hall voltage by an additional signal voltage. Although I have disclosed only selected embodiments of the invention, many modifications may be made. It is to be understood that I intend to cover, by the appended claims, all such modifications as fall within the true spirit and scope of the invention.

What I claim as new and desire to secure by Letters Patent of the United States is:

1. Hall effect apparatus comprising a Hall plate including a germanium body member of predetermined polarity conductivity type and having a pair of input electrodes for supplying a current along one axis of said body member and a pair of output electrodes for providing an output Hall effect voltage developed along an orthogonal axis thereof, one of said input electrodes constituting a mobile charge emitting connection with said body member for emitting conduction carriers thereinto of opposite polarity to the conductivity type of said body member, means for establishing a magnetic field through said plate in a direction perpendicular to the plane thereof, and means for supplying to said mobile charge emitting electrode and relative to said other input electrode an electric potential having the same polarity as said emitted conduction carriers.

2. Hall effect apparatus comprising an N-type germanium plate having a pair of input electrodes for supplying a current along one axis thereof and having a pair of output electrodes for providing an output Hall effect voltage developed along an orthogonal axis thereof, one of said input electrodes constituting a positive charge emitting connection with said plate, means for establishing a magnetic field through said plate in a direction perpendicular to the plane thereof, and means for supplying to said positive charge emitting input electrode a positive potential relative to the other input electrode.

3. Hall effect apparatus comprising a P-type germanium plate having a pair of input electrodes for supplying a current along one axis thereof and having a pair of output electrodes for providing an output Hall effect voltage developed along an orthogonal axis thereof, one of said input electrodes constituting a negative charge emitting connection with said plate, means for establishing a magnetic field through said plate in a direction perpendicular to the plane thereof, and means for supplying to said negative charge emitting input electrode a negative potential relative to the other input electrode.

4. Hall effect apparatus comprising an N-type germanium plate having a pair of input electrodes for supplying a current along one axis thereof and having a pair of output electrodes for providing an output Hall effect voltage developed along an orthogonal axis thereof, means for supplying to one input electrode a positive potential relative to the other input electrode, a positive charge emitting electrode located close to and between each output electrode on the opposite side thereof from said other input electrode, means for supplying to said positive charge emitting electrode a positive potential relative to said other input electrode, and means for establishing a magnetic field through said plate in a direction perpendicular to the plane thereof.

5. Hall effect apparatus comprising a P-type germanium plate having a pair of input electrodes for supplying a current along one axis thereof and having a pair of output electrodes for providing an output Hall effect voltage developed along an orthogonal axis thereof, means for supplying to one input electrode a negative potential relative to the other input electrode, a negative charge emitting electrode located close to and between each output electrode on the opposite side thereof from said other input electrode, means for supplying to said negative charge emitting electrode a negative potential relative to said other input electrode, and means for establishing a magnetic field through said plate in a direction perpendicular to the plane thereof.

6. Hall effect apparatus comprising a germanium member of predetermined polarity conductivity type having a pair of spaced input electrodes for supplying an input current through said member along a path between said input electrodes and having a pair of output electrodes aligned on opposite sides of the input current path for providing a Hall effect voltage between said output electrodes, one of said input electrodes comprising a mobile charge emitting connection with said member capable of introducing conduction carriers in said germanium member having a polarity opposite to that of said member conductivity type, and means for establishing a magnetic field through the input current path of said member and between said output electrodes in a direction substantially perpendicular to a plane including said input and output electrodes.

7. Hall effect apparatus comprising an N-type germanium plate having a pair of spaced input electrodes for supplying a current through said plate along a path between said input electrodes, one of said input electrodes comprising an acceptor impurity element for germanium, a pair of output electrodes connected to said plate on opposite sides of the input current path in the immediate vicinity of said acceptor impurity containing electrode, and means for establishing a magnetic field through said member in a direction substantially perpendicular to a plane including said input and output electrodes.

8. Hall effect apparatus comprising a P-type germanium plate having a pair of spaced input electrodes for supplying a current therethrough said plate along a path between said input electrodes, one of said input electrodes comprising a donor impurity element for germanium, a pair of output electrodes connected to said plate on opposite sides of the input current path in the immediate vicinity of said donor impurity containing electrode, and means for establishing a magnetic field through said member in a direction substantially perpendicular to a plane including said input and output electrodes.

9. Hall effect apparatus comprising a thin germanium plate having a P-type zone and an adjoining N-type zone, said P-type zone constituting a first input electrode for said apparatus, a second input electrode connected to said N-type zone and spaced from said P-type zone, means for biasing said first electrode at a positive potential with respect to said second electrode, a pair of output electrodes connected to opposite edges of the N-type zone of said plate within .040" from the junction of said P-type zone and said N-type zone, and means for establishing a magnetic field perpendicularly cutting said plate between said output electrodes.

10. Hall effect apparatus comprising a germanium plate having a P-type zone, an N-type zone, and a P-N junction between said zones, a pair of spaced output electrodes connected to said P-type zone each within .040" from said P-N junction, an input electrode connected to said P-type zone in a location more remote from said N-type zone than said output connection and in a position to supply current from said input electrode to said N-type zone along a path lying between said output electrodes, and means for establishing a strong magnetic field through said plate between said output electrodes in a direction perpendicular to the plane of said plate.

11. Hall effect apparatus comprising an elongated germanium plate of predetermined polarity conductivity type having a pair of spaced input electrodes for supplying an input current along the longitudinal axis of said plate and having a pair of output electrodes aligned on opposite sides of said input current carrying axis of said plate, one of said input electrodes being located in the immediate vicinity of each output electrode and constituting a rectifying connection with said plate, means for biasing said rectifying connection input electrode relative to said other input electrode at an electric potential having a polarity opposite to the conductivity type of said plate, and means for establishing a strong magnetic field perpendicularly cutting said plate through its current carrying axis and between said output electrodes.

12. Hall effect apparatus comprising a rectangular elongated N-type germanium plate having a pair of input electrodes connected to opposite shorter edges of said plate and having a pair of output electrodes connected to the remaining opposite longer edges of said plate, means for establishing a magnetic field through said plate perpendicular to the plane thereof, and an additional input electrode comprising an acceptor impurity element for germanium connected to said plate and extending closer than .040" from each output Hall electrode.

13. Hall effect apparatus comprising a rectangular elongated P-type germanium plate having a pair of input electrodes connected to opposite shorter edges of said plate and having a pair of output electrodes connected to the remaining opposite longer edges of said plate, means for establishing a magnetic field through said plate perpendicular to the plane thereof, and an additional input electrode comprising a donor impurity element for germanium connected to said plate and extending closer than .040" from each output Hall electrode.

14. A Hall effect apparatus comprising an N-type germanium Hall plate having spaced input Hall electrodes, one of said input electrodes comprising an acceptor impurity element for germanium, means for establishing a magnetic field through said plate perpendicular to the plane thereof, and means for supplying to said acceptor impurity element a positive potential with respect to the other input Hall electrode.

15. A Hall effect apparatus comprising a P-type germanium Hall plate having spaced input Hall electrodes, one of said input electrodes comprising a donor impurity element for germanium, means for establishing a magnetic field through said plate perpendicular to the plane thereof, and means for supplying to said donor impurity element a positive potential with respect to the other input Hall electrode.

16. A Hall effect control device comprising a germanium Hall plate of predetermined polarity conductivity type having input and output Hall electrodes located along respective perpendicular crossing lines and on opposite sides of the crossing point, one of said input electrodes constituting a zone of said plate of opposite polarity conductivity type than the remainder of said plate, and said output Hall electrodes being located less than .040" away from said opposite polarity conductivity type zone.

17. A Hall effect control device comprising a germanium plate having a P-type zone, an N-type zone and a rectifying P-N junction between said zones, a pair of spaced output electrodes connected to said N-type zone and each located less than .040" away from said P-N junction, and a third electrode connected to said N-type zone in a location further removed from said P-N junction than said output electrodes and along a current path extending from said P-type zone between said output electrodes.

18. A Hall effect control device comprising an N-type germanium Hall plate having a pair of output electrodes contacting opposed edges of said plate and a pair of input electrodes contacting said plate on opposite sides of a line connecting said output electrodes, one of said input electrodes being a positive charge emitter comprising an acceptor impurity element for germanium.

19. A Hall effect control device comprising a P-type germanium Hall plate having a pair of output electrodes contacting opposed edges of said plate and a pair of input electrodes contacting said plate on opposite sides of a line connecting said output electrodes, one of said input electrodes being a negative charge emitter comprising a donor impurity element for germanium.

20. A Hall effect control device comprising an N-type germanium Hall plate having a pair of output electrodes contacting opposed edges of said plate and a pair of input electrodes contacting said plate on opposite sides of a line connecting said output electrodes, one of said input electrodes comprising indium.

21. A Hall effect control device comprising a P-type germanium Hall plate having a pair of output electrodes contacting opposed edges of said plate and a pair of input electrodes contacting said plate on opposite sides of a line connecting said output electrodes, one of said input electrodes comprising antimony.

22. A Hall effect control device comprising an N-type germanium Hall plate having a pair of output electrodes contacting opposed edges of said plate and a pair of input electrodes contacting said plate on opposite sides of a line connecting said output electrodes, one of said input electrodes comprising a P-type germanium zone of said plate.

23. A Hall effect control device comprising a P-type germanium Hall plate having a pair of output electrodes contacting opposed edges of said plate and a pair of input electrodes contacting said plate on opposite sides of a line connecting said output electrodes, one of said input electrodes comprising an N-type germanium zone of said plate.

References Cited in the file of this patent

UNITED STATES PATENTS

| | | |
|---|---|---|
| 1,778,796 | Craig | Oct. 21, 1930 |
| 2,464,807 | Hansen | Mar. 22, 1949 |
| 2,550,492 | Millar | Apr. 24, 1951 |
| 2,562,120 | Pearson | July 24, 1951 |
| 2,586,080 | Pfann | Feb. 19, 1952 |
| 2,589,658 | Bardeen et al. | Mar. 18, 1952 |
| 2,594,939 | Leete | Apr. 29, 1952 |
| 2,609,428 | Law | Sept. 2, 1952 |
| 2,623,102 | Shockley | Dec. 23, 1952 |
| 2,629,672 | Sparks | Feb. 24, 1953 |